May 17, 1932.    E. RUTHERFORD    1,858,751
JAW TRAP
Filed Feb. 10, 1931    2 Sheets-Sheet 1
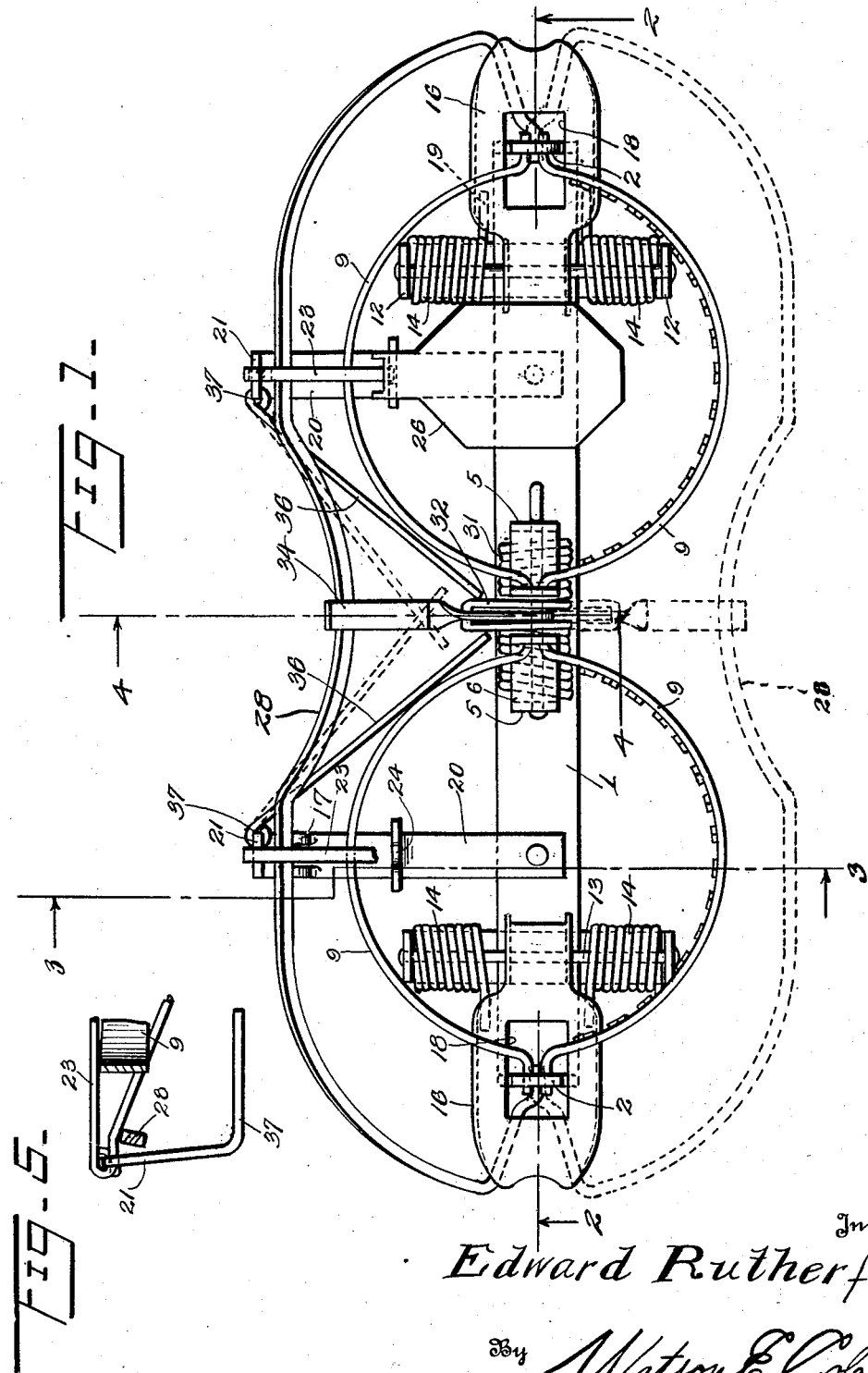
Inventor
Edward Rutherford
By Watson E. Coleman
Attorney May 17, 1932.  E. RUTHERFORD  1,858,751
JAW TRAP
Filed Feb. 10, 1931   2 Sheets-Sheet 2
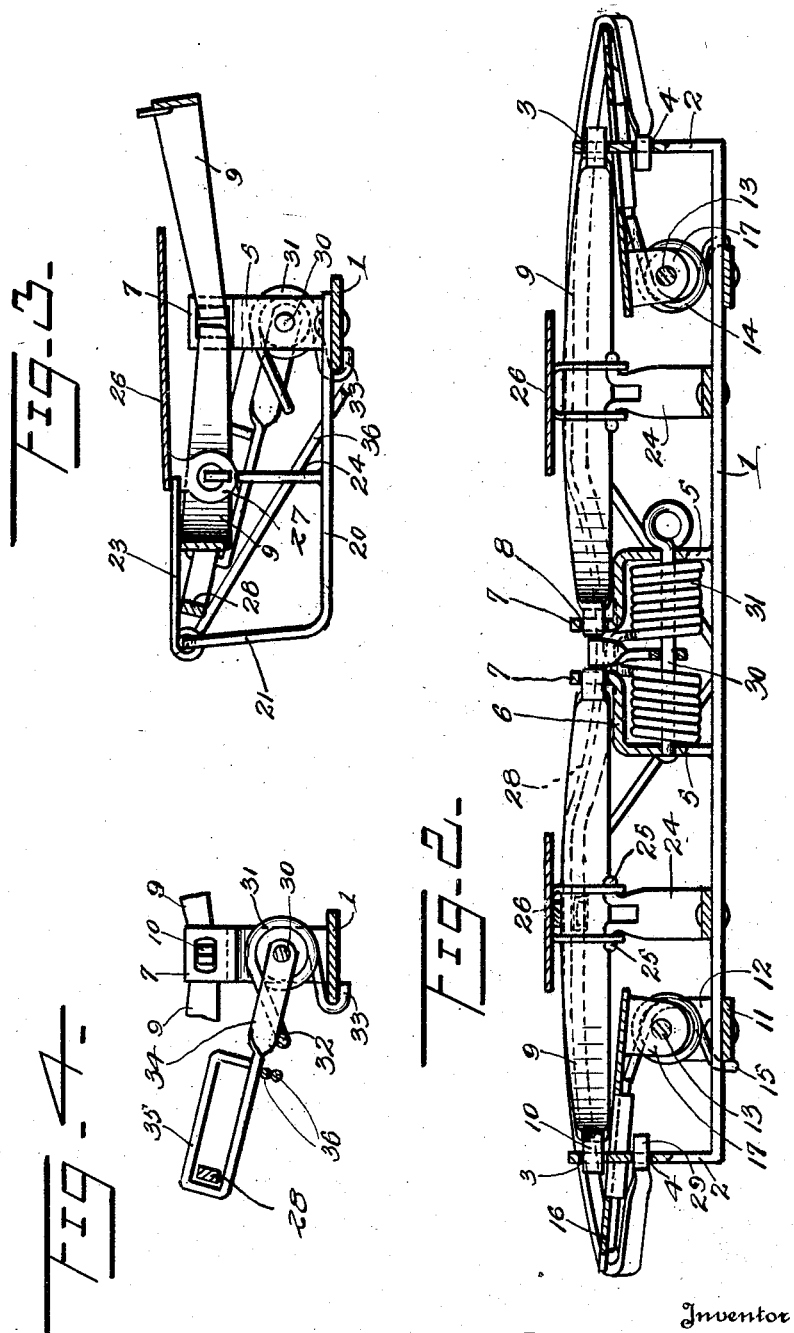
Inventor
Edward Rutherford
By Watson E. Coleman
Attorney Patented May 17, 1932

1,858,751

UNITED STATES PATENT OFFICE

EDWARD RUTHERFORD, OF CAMERON, LOUISIANA, ASSIGNOR OF ONE-THIRD TO JOHN WALTER RUTHERFORD AND ONE-THIRD TO JOE RUTHERFORD, BOTH OF CAMERON, LOUISIANA

JAW TRAP

Application filed February 10, 1931. Serial No. 514,817.

This invention relates to the class of fishing and trapping, and pertains particularly to improvements in jaw traps.

The primary object of the present invention is to provide a jaw trap having associated therewith a spring operated element which will act after the animal is trapped to force it down so that it will not be able to gnaw its foot and thus escape.

Another object of the invention is to provide a trap having a double set of jaws by means of which both a front and a back foot of the animal may be caught so that it will be more firmly held against escape.

A still further object of the invention is to provide a double jaw trap having associated therewith a spring actuated push-over bar which is normally held against movement by the triggers controlling the jaws and which, when released after the operation of the jaws, acts to hold the animal down and thus prevent it from reaching and knawing off its feet.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

Figure 1 is a view in top plan of the trap embodying the present invention showing the same set and showing in dotted lines the position of the pivoted frame after the trap has been sprung.

Figure 2 is a longitudinal sectional view taken on the line 2—2 of Figure 1.

Figure 3 is a transverse sectional view taken on the line 3—3 of Figure 1.

Figure 4 is a sectional view taken on the line 4—4 of Figure 1.

Figure 5 is a sectional view through one of the jaw members adjacent the trigger therefor showing the animal holding bar latched in position.

Referring more particularly to the drawings, wherein like numerals of reference indicate corresponding parts throughout the several views, the numeral 1 indicates the supporting base of the trap which, as shown, is in the form of a relatively long flat bar having each end turned upwardly, as at 2. Each upturned end is provided with a pair of vertically spaced openings, the upper ones of which are indicated by the numerals 3 while the lower ones are indicated by the numerals 4. Intermediate its ends there is mounted upon the base bar 1 a pair of upstanding brackets, each of which is indicated by the numeral 5, each of which brackets has an upper horizontally extending portion 6 which terminates at its free end in the vertical tip 7 which has an aperture 8 therethrough. As shown in Figure 2, the horizontal portions 6 are arranged in end opposed relation so that the tips 7 are relatively closely related and the apertures 8 in the tips 7 are in alignment with the apertures 3 in the upturned ends of the base.

Disposed between each end portion 2 of the base and the adjacent bracket tip 7 is a pair of arcuately shaped jaws, each of which is indicated by the numeral 9. Each of these jaws has a longitudinally extending trunnion 10 at each end, one of which positions in the aperture 3 of the adjacent portion 2, while the other positions in the aperture 8 of the adjacent bracket terminal portion 7. These jaw members 9 oscillate relative to one another so as to come into contacting relation above the trap base 1 in the manner usual with jaw traps of this character.

Disposed transversely of the base 1 adjacent each end and beneath the adjacent pair of jaws 9 is an elongated plate 11, which is secured to the base in the manner shown and which carries the upstanding terminals 12 at the ends thereof. Between the terminals 12 of each of these plates is located a pin or shaft 13 which passes through a pair of longitudinally spaced aligned coiled springs 14, each of which has one end secured to the adjacent plate 11, as indicated at 15.

Oscillatably mounted upon each of the pins 13 is an elongated centrally apertured plate 16, the mounting of each plate upon its shaft being accomplished through the medium of a pair of downturned apertured ears 17, through which the pin passes. The aperture of each plate 16 is indicated by the numeral 18 and, as shown in Figure 1, this aperture is designed to receive the upper end of the adjacent upturned portion 2 and also the jaws 9 when the plate is forced upwardly thereagainst by means of the other ends 19 of the springs 14, which are located therebeneath.

Beneath each pair of jaws 9 there extends laterally from the base 1 a bar 20, the outer end of which is turned upwardly, as at 21, and is apertured to receive the looped end 22 of a trigger 23. Each of these bars 20 carries intermediate its ends an upright bracket 24 upon the laterally directed ears 25 of which is oscillatably mounted a bait pan 26, through the medium of the downturned ears 27 which are formed integral therewith.

Extending longitudinally of the trap structure is a flat substantially U-shaped frame 28. Each end of this frame is turned inwardly, as at 29, to form a pivot trunnion which positions in the aperture 4 in an upturned end portion of the base. It will be seen from Figure 1 that this frame 28, when oscillated, will swing transversely of the trap over the two pairs of jaw members.

Mounted longitudinally of the base 1, between and supported by the brackets 5, is a pin 30 upon which is mounted a double spring 31. The adjacent ends of this double spring are connected by an elongated loop 32, while the remote ends are secured to the base, as indicated at 33.

Oscillatably mounted at one end upon the pin 30 is an arm 34, the outer end of which is turned back to form the elongated loop 35 through which the central portion of the frame 28 passes. The loop 32 of the double spring engages one side of the arm 34, the pivoted end of this arm being located between the ends of the two portions of the double spring 31, as illustrated in Figure 2.

The spring 31 is so tensioned that it will constantly urge the arm 34 and the frame engaged thereby over to the side of the trap structure remote from the triggers 23, as illustrated by dotted lines in Figure 1. It will thus be seen that when this frame is forced over in the opposite direction the spring 31 will be placed under additional tension.

In order to hold the frame in this position until the jaws of the trap have been set there is provided a pair of latch fingers each of which is indicated by the numeral 36. Each of these fingers is pivotally mounted as at 37 upon one of the upstanding portions 21 of a bar 20, and they are employed to hold the frame 28 in place by positioning them over the frame and crossing the free ends beneath the arm 34 in the manner shown by dotted lines in Figure 1. It will thus be seen that the frame 28 will be prevented from swinging over from its set position. After the frame 28 has been set the jaws of the trap may be opened by pressing downwardly upon the outer ends of the plates 16. This will force the plates down beneath the pivot points of the jaws so that the jaws will fall apart, one of them dropping to position over the adjacent bar 20 between the upstanding end 21 thereof and the bracket 24 carried thereby. The triggers 23 may then be swung over to lie across the bar 28 and the adjacent one of a pair of jaws 9, and engaged beneath the edge of the adjacent bait pan 26. Upon releasing the pressure applied to the plates 16 the springs 14 will force the plates upwardly against the adjacent jaws and thus securely hold the triggers in frictional engagement with their respective bait pans.

After the jaws 9 have been set and are held down by the triggers 23 the latch fingers 36 may then be removed from the position in which they are shown and swung to an inoperative position beneath the frame as illustrated in Figure 1. The frame will then be held in place by the triggers 23 until both pairs of jaws 9 have been sprung.

Thus the trap is set and after this operation the arm 38 is oscillated to disengage the latch 36 from the frame 28 so that, upon the bait pans being depressed, both jaws will be forced to closed position and the frame 28 will be released to swing over from one side of the trap to the other under the influence of the control spring 31.

From the foregoing description it will be readily seen that with a trap of this character an animal may be caught by two feet, as for example by a front and a back foot, and upon the springing of the second one of the pair of jaws the frame 28 will be released and strike the side of the animal's body and thus force it down into such a position that it cannot reach its feet to gnaw them off and thus escape.

The inturned ends of the frame 28 are loosely engaged in the upturned positions 2 of the trap base 1 as illustrated in Figure 4 and the frame 28 is formed of springy material so that the ends thereof may be disengaged from the trap base and the trap used without this frame. In some cases the trapper may not wish to have the animal killed after it is caught by the jaws 9 and since the swinging of the frame 28 against the animal's side will in most instances kill the animal, this frame may be removed as described.

Having thus described my invention, what I claim is:

1. A trap of the character described, comprising a base, a pair of jaw members having pivotal connection with said base, spring means for closing said jaws over the base, a trigger mechanism for holding said jaws open against the tension of the spring means, an elongated substantially U-shaped frame having each end pivotally connected with said base, said frame being of a depth to swing over said jaws from one side of the trap to the other, an arm pivotally attached at one end to the base and having loose connection at its other end with the frame, and spring means mounted on the base and engaging the arm to actuate the same, and normally urging the frame through the arm to the side of the trap remote from the trigger mechanism, said trigger mechanism being designed to hold the frame in set position with the jaw members.

2. A trap of the character described, comprising an elongated base, two pairs of jaws pivotally mounted upon said base, said jaws being in end to end relation, spring means controlling each pair of jaws, a trigger mechanism for each pair of jaws, an elongated substantially U-shaped frame having each end pivotally mounted in one end of the base whereby it may oscillate over the jaws from one side of the trap to the other, and spring means normally urging the frame to the side of the trap remote from said triggers, said triggers being designed to cooperatively hold said frame in set position.

3. A trap of the character described, comprising an elongated base, two pairs of jaws pivotally mounted upon said base, said jaws being in end to end relation, spring means controlling each pair of jaws, a trigger mechanism for each pair of jaws, an elongated substantially U-shaped frame having each end pivotally mounted in one end of the base whereby it may oscillate over the jaws from one side of the trap to the other, spring means normally urging the frame to the side of the trap remote from said triggers, said triggers being designed to cooperatively hold said frame in set position, and latch means to hold said frame in set position in advance of the setting of the jaws.

4. A trap of the character described, comprising an elongated base, two pairs of jaws pivotally mounted upon said base, said jaws being in end to end relation, spring means controlling each pair of jaws, a trigger mechanism for each pair of jaws, an elongated substantially U-shaped frame having each end pivotally mounted in one end of the base whereby it may oscillate over the jaws from one side of the trap to the other, an arm pivotally mounted at one end upon said base between the pairs of jaws and having loose connection at its other end with said frame, and a spring element mounted upon the base and engaging said arm and normally urging the frame through the arm away from said trigger mechanisms, said frame being designed to be engaged by both trigger mechanisms to be held in set position thereby.

5. A trap of the character described, comprising an elongated base, two pairs of pivotally mounted jaws arranged in end to end relation upon the base, a shaft extending transversely of the base beneath each pair of jaws, means for closing each pair of jaws comprising an apertured plate designed to ride up on the jaws and carried by the adjacent shaft, spring means carried by each shaft for actuating the adjacent plate, a trigger mechanism for each pair of jaws for maintaining the same in set relation, an elongated substantially U-shaped frame having each end pivotally mounted upon one end of the base whereby the frame may swing over the jaws from one side of the trap to the other, and a spring actuated arm pivotally mounted upon the base between the pairs of jaws and having loose connection with said frame, said frame being designed to be engaged by both trigger mechanisms to retain the frame in set position with the jaws.

6. A trap of the character described, comprising an elongated base having each end turned upwardly and provided with a pair of apertures, a pair of apertured upstanding members upon said base at a point substantially midway between the ends thereof, a pair of jaws each disposed between an upstanding end member and a centrally positioned member and having their ends turned outwardly and engaged in the apertures of the adjacent members, spring means for actuating said jaws, trigger means for maintaining said jaws in set position, a single long jaw of a length greater than said base and having each end turned inwardly and engaged in one of the two apertures of the adjacent upstanding portion of the base, said long jaw being of resilient material whereby its ends may be removed from engagement with the supporting ends of the base, and spring means for shifting said long jaw from a position at one side of the base, across the first mentioned jaws, to the opposite side of the base, said trigger members being designed to maintain said long jaw in a set position.

7. A trap of the character described, comprising an elongated base having each end turned upwardly and each upturned end provided with a pair of apertures, a pair of apertured upstanding members upon said base at a point substantially midway between the ends thereof, a pair of jaws each disposed between an upstanding end member and one of said pair of members and each having its ends turned outwardly and engaged in the apertures of the members between which it is positioned, spring means for actuating said jaws, trigger means for maintaining said jaws in set position, a single long jaw of a length greater than said base and having each end turned inwardly and engaged in one of the two apertures of the adjacent upstanding end of the base, said long jaw being of resilient material whereby its ends may be removed from engagement with the supporting ends of the base, said upstanding members between the ends of the base being in spaced relation, a pin member connecting and carried by said pair of members, a coil spring surrounding and carried by said pin, and an arm oscillatably mounted at one end upon said pin and having its other end connected with said long jaw and further having said last spring connected therewith for actuation thereby across the trap base, said long jaw being maintained in set position by said triggers.

8. In a trap structure of the character described, a base having a pair of spaced upstanding ears, a pair of jaws pivotally mounted on said base, spring means for actuating said jaws, trigger means for maintaining said jaws in set position, an elongated substantially U-shaped bar member extending longitudinally of said base and having its ends pivotally attached to the upstanding ears of the base to swing from one side of the trap to the other across said jaws, a spring actuated arm oscillatably mounted at one end upon said base and having loose connection at its other end with said bar, said bar being secured in set position by said trigger, a laterally extending member carried by the base, and a setting latch pin pivotally connected at one end with said laterally extending member and designed to be swung over said bar for the engagement of its free end beneath said arm to maintain the bar in set position during the setting of said jaws.

In testimony whereof I hereunto affix my signature.

EDWARD RUTHERFORD.